June 23, 1970     H. SHAKESPEAR     3,516,684

BRAKE SPLASH SHIELD

Filed Oct. 1, 1968

INVENTOR.
Horacio Shakespear
BY
D. D. McGraw
ATTORNEY

United States Patent Office 3,516,684
Patented June 23, 1970

---

3,516,684
BRAKE SPLASH SHIELD
Horacio Shakespear, Troy, Mich., assignor to General Motors Corporation, Detroit, Mich., a corporation of Delaware
Filed Oct. 1, 1968, Ser. No. 764,258
Int. Cl. B62d 25/16
U.S. Cl. 280—124                                    3 Claims

ABSTRACT OF THE DISCLOSURE

Splash shields are attached to the bottoms of vehicle lower control arms and shaped to prevent road splash from the opposite wheels from contacting the brake units.

---

Figure 1:
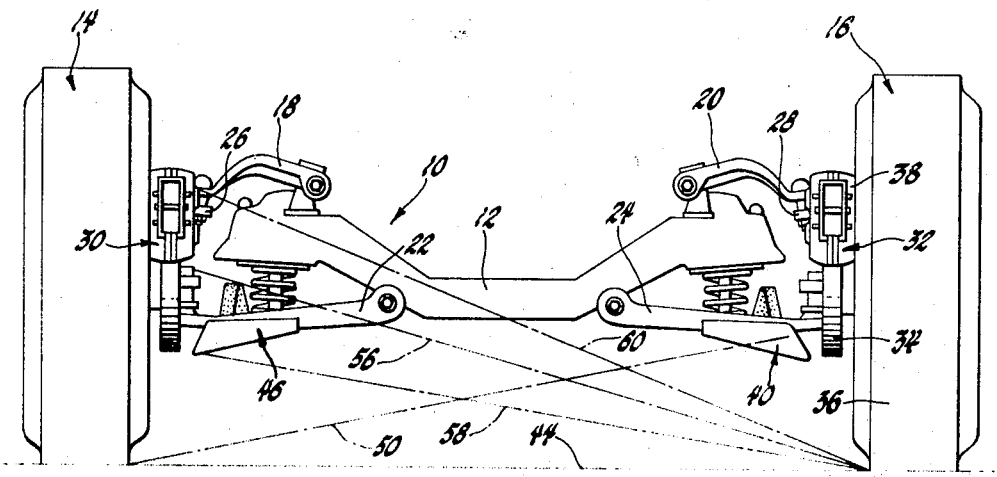

The invention relates to road splash shields for vehicle brake units and more particularly to shields which intersect the road splash cone patterns emanating from a wheel on one side of the vehicle toward the brake unit of a wheel on the other side of the vehicle. When the brake units are generally circular in shape, as brake drums or discs, the road splash from a left front wheel, for example, will splash transversely of the vehicle in a pattern including an oblique cone tending to impinge on the right front brake unit. While some elements of the vehicle frame and chassis usually intersect the cone pattern, there is a considerable amount of road splash which is not prevented from hitting the brake unit. This is particularly important when the brake unit is not enclosed, as is often the case with a disc brake unit. Generally circular splash shields have sometimes been provided inwardly adjacent the rotating discs. However, such splash shields also tend to limit cooling of the discs. It is now proposed that splash shields be mounted well away from the discs but still intersecting the road splash paths which are not otherwise intersected by other structure so as to prevent the impingement of road splash on the brake units. The splash shields embodying the invention are mounted obliquely to the splash paths and are provided with coamings which extend at generally right angles ot the road splash paths and downwardly so as to deflect road splash back to the road surface and also to provide drip edges for splash residue so that the residue may fall to the road surface.

Figure 2:
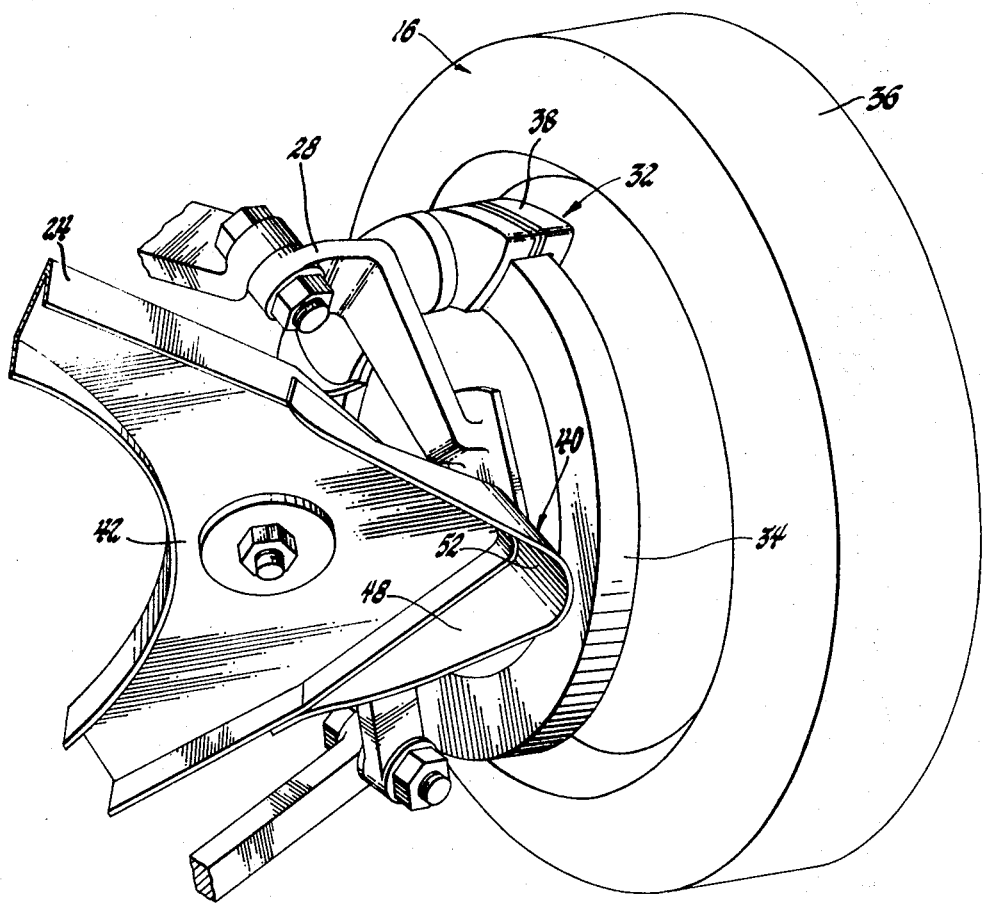

In the drawing:

FIG. 1 is a front end view of the relevant portions of a vehicle having splash shields embodying the invention; and FIG. 2 is a more detailed view of one of the splash shield installations.

The vehicle 10 is illustrated as having a cross member 12 to which various chassis components for the vehicle front wheel assemblies 14 and 16 are mounted. The chassis components include the upper control arms 18 and 20 and the lower control arms 22 and 24. Suitable spindles 26 and 28 are provided for mounting the brake units 30 and 32 and the wheel assemblies 14 and 16. The usual springs and shock absorbers are also provided. The brake units 30 and 32 are illustrated as caliper type disc brakes.

Brake unit 32 is illustrate in greater detail in FIG. 2 and, since each side of the installation is substantially identical, only the elements associated with wheel assembly 16 will be described in greater detail. Brake unit 32 includes a disc 34 attached for rotation with the wheel on which the vehicle tire 36 is mounted. A brake caliper 38 is suitably mounted to the spindle 28 so that the vehicle wheel may be braked. Any type of brake caliper may be utilized. The splash shield 40 is mounted on the under side of the lower control arm 24 adjacent the arm lower surface 42 which forms the under side of the control arm and is generally parallel to the road surface 44. If the control arm is not constructed with an integral surface 42, the shield assembly would include such a surface. Therefore surface 42 may be considered to be a part of the splash shield. A similar splash shield 46 is mounted on the lower control arm 22. The splash shields are each formed to provide a coaming 48 which is suitably curved to intersect the road splash from the opposite wheel. Thus the coaming of splash shield 40 protects the brake unit 32 from the road splash generated by wheel assembly 14.

A road splash path 50 is illustrated in FIG. 1 to show that road splash intersects the splash shield 40 and is deflected downwardly to the road surface 44. The coaming 48 is so positioned that it intersects the road splash path 50 at a generally right angle as seen in FIG. 1, so that road splash either impinging directly at the inner end 52 of the coaming, or on the surface 42 or other inner portions of the coaming, will be deflected downwardly and the coaming will also provide drip edges so that splash residue will drip downwardly to the road surface instead of onto portions of the wheel assembly.

The splash shield is so arranged that it covers the portions of the cone splash pattern, illustrated by the cone center line 56 and the cone edge lines 58 and 60, which would otherwise impinge on each brake unit. It can be seen that road splash material engaging splash shield surface 42, for example, will be dynamically deflected to coaming 48 and further dynamically deflected to the road surface. No surfaces are provided which will tend to entrap road splash material, and the only residue will normally be small amounts of water which will drip from the splash shield as the vehicle moves over the road.

What is claimed is:

1. In a vehicle having a chassis including first and second oppositely disposed suspension arms and first and second wheel assemblies mounted on said suspension arm on opposite sides of the vehicle and first and second brake units for said first and second wheel assemblies positioned on the inward sides thereof and subject to road splash from the opposite wheel assembly, the improvement comprising:

first and second road splash shields respectively mounted on said first and second suspension arms and respectively intersecting the road splash pattern of said second wheel assembly intermediate said second wheel assembly and said first brake unit, and the road splash pattern of said first wheel assembly intermediate said first wheel assembly and said second brake unit in pattern areas preventing road splash from said wheel assemblies from impinging on said brake units.

2. The invention defined by claim 1 in which said splash shields are mounted on the under sides of said suspension arms and include some road splash impinging surfaces substantially normal to the paths of road splash and extending downwardly to provide drip edges so that road splash is dynamically deflected to the road surface and splash residue drips clear of said wheel assemblies.

3. The invention defined by claim 1 in which the portions of said road splash patterns tending to impinge on said brake uints define oblique cones, and said splash shields intersect said cones obliquely and have coaming sections extending generally at right angles to portions of the road splash paths defining said cones.

References Cited

UNITED STATES PATENTS

| 3,298,469 | 1/1967 | Robinette | 188—73 |
| 3,354,992 | 11/1967 | Cook et al. | 188—73 |

BENJAMIN HERSH, Primary Examiner

L. J. PAPERNER, Assistant Examiner

U.S. Cl. X.R.

280—154.5